United States Patent [19]

Crosslen

[11] Patent Number: 4,652,243
[45] Date of Patent: Mar. 24, 1987

[54] PUNCTURE SEALANT DEMONSTRATOR FOR TIRES

[75] Inventor: Louis J. Crosslen, Saukville, Wis.

[73] Assignee: Frank Mayer & Associates, Grafton, Wis.

[21] Appl. No.: 778,622

[22] Filed: Sep. 23, 1985

[51] Int. Cl.$^4$ .......................................... G09B 25/00
[52] U.S. Cl. ....................................... 434/376; 30/448
[58] Field of Search ................ 30/448; 40/587; 73/49, 73/146; 434/61, 67, 375, 376

[56] References Cited

U.S. PATENT DOCUMENTS

| | | | |
|---|---|---|---|
| 970,170 | 9/1910 | Bishop | 30/448 |
| 1,452,287 | 4/1923 | Burke | 30/448 X |
| 2,469,307 | 5/1949 | Mechling | 434/376 X |
| 3,203,088 | 8/1965 | Voll | 30/448 |
| 3,444,629 | 5/1969 | Ward | 434/375 |
| 3,478,445 | 11/1969 | McAfee | 434/375 |
| 3,894,420 | 7/1975 | Fuchslin | 73/49 X |
| 4,082,265 | 4/1978 | Berkes | 434/61 X |
| 4,348,891 | 9/1982 | Stickler | 73/146 X |

FOREIGN PATENT DOCUMENTS 844667 8/1960 United Kingdom ................ 30/448

*Primary Examiner*—Harland S. Skogquist
*Attorney, Agent, or Firm*—Andrus, Sceales, Starke & Sawall

[57] ABSTRACT

A display for demonstrating puncture sealant tires includes a housing for supporting a tire in an upright position having a base supporting an upstanding frame, a tire restraint on the frame for holding the tire in its upright position, and a pair of spaced apart rollers rotatably mounted on the base for permitting rotation of the tire with respect to the housing to any desired position. A spike member is mounted on a handle assembly which in turn is pivotally mounted on the housing frame for movement between a first non-puncturing position and a second tire puncturing position. A spring in the form of a flat resilient plastic member is mounted on the handle assembly and acts in opposition to the movement of the handle assembly to bias the handle assembly to its first non-puncturing position.

7 Claims, 3 Drawing Figures

U.S. Patent   Mar. 24, 1987   4,652,243
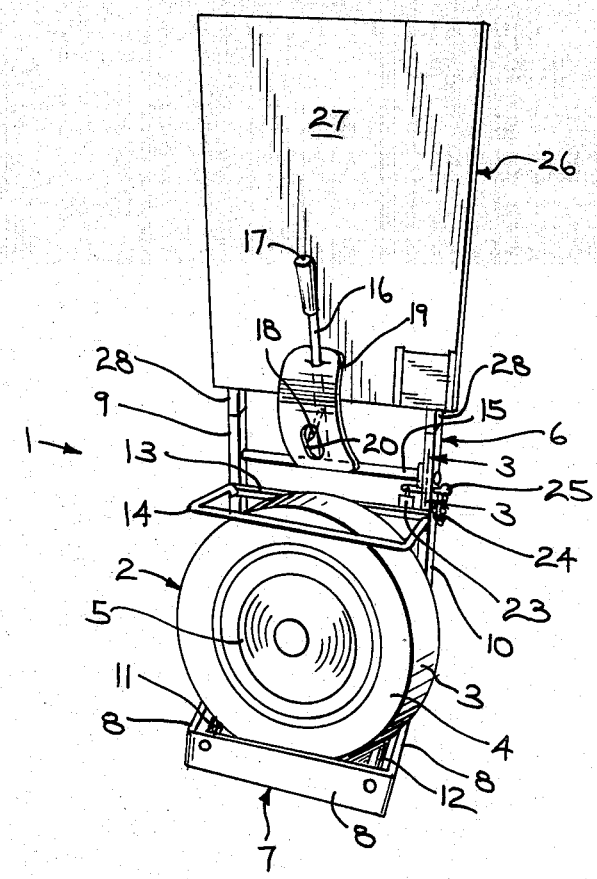
FIG. 1
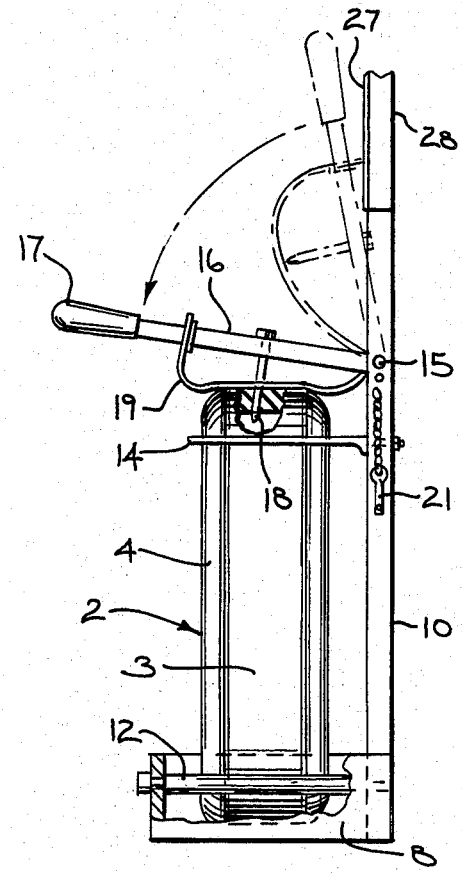
FIG. 2
FIG. 3

4,652,243

PUNCTURE SEALANT DEMONSTRATOR FOR TIRES

BACKGROUND OF THE INVENTION

The present invention relates to display stands, and more particularly to a display stand for demonstrating puncture sealant tires.

Automobile tires incorporating an automatic puncture sealant feature have been developed for sale in various markets. To promote such tires, it is desirable to provide a display stand for demonstrating the self-sealing feature of such tires to potential customers. Such display stands must be constructed to clearly demonstrate the procedure to a customer, and be lightweight, relatively portable and durable.

SUMMARY OF THE INVENTION

A display stand for demonstrating puncture sealant tires including a housing for supporting a tire, puncture means for puncturing the tire, and actuating means carried by the housing for moving the puncture means between a first non-puncturing position and a second tire puncturing position.

The display stand further includes a tire restraint on the housing for holding the tire in an upright position, and roller mens on the housing for permitting rotation of the tire with respect to the housing to any desired position. The tire restraint is in the form of a bracket member encircling a portion of the top of the tire to hold the tire upright, and the roller means comprises a pair of rollers rotatably mounted in radially spaced relationship to one another and positioned to engage and support the tire above a supporting surface for the housing. Thus, the tire is held in an easily viewable position and may be rotated to insure that a new puncture position is provided for each demonstration.

The actuating means includes a handle assembly pivotally mounted on the housing for moving between the non-puncturing and puncturing positions. The handle assembly is T-shaped with the head of the T comprising a pivoting axle and the leg of the T comprising a lever projecting outwardly over and above the tire. The puncturing means includes a spike member mounted on the lever of the handle assembly which projects downwardly therefrom when the handle assembly is in its tire puncturing position. Thus, the handle assembly may be conveniently grasped by a user who then has sufficient leverage for easily puncturing the tire. A lock may also be incorporated with the handle assembly as a safety feature to hold the handle assembly in its non-puncturing position when not in use.

The display stand may also include spring means acting in opposition to the movement of the handle assembly to bias the handle assembly in its first non-puncturing position. This spring means includes a flat, flexible, resilient member mounted on the lever of the handle assembly and projecting beneath the spike member for engagement with a tire in the tire puncturing position. The resilient member is preferably composed of polycarbonate and includes an opening formed intermediate its ends for permitting the spike member to puncture the tire.

The present invention thus provides a display stand for demonstrating puncture sealant tires which demonstrates the self-sealing procedure in a readily apparent manner, is durable, and is easy to operate.

BRIEF DESCRIPTION OF THE DRAWINGS

The drawings illustrates the best mode presently contemplated of carrying out the invention.

In the drawings:

FIG. 1 is a front elevational view illustrating a display stand for demonstrating puncture sealant tires constructed in accordance with the principles of the present invention;

FIG. 2 is an end view in elevation of the display stand of FIG. 1 illustrating the puncturing of a tire; and FIG. 3 is a detail view illustrating a locking mechanism for the handle assembly of the display stand.

DESCRIPTION OF THE PREFERRED EMBODIMENT

Referring now to the drawings, FIGS. 1-2 illustrate a display stand, constructed in accordance with the present invention and designated generally the numeral 1, for demonstrating puncture sealant tires. As shown, stand 1 is utilized with an automobile tire 2 of conventional dimensions having tread 3 and sidewalls 4 which is mounted on a conventional rim 5. Tire 2 is of the type which incorporates a puncture sealant which provides a self-sealing feature for tire 2 should tire 2 be punctured by a nail, screw or other sharp object.

Display stand 1 includes a housing for supporting tire 2 in an upright position so that the axis of rotation for tire 2 is substantially horizontal. The housing includes a frame 6 and a base 7 supporting frame 6 in an upright or upstanding manner. Base 7 includes four upstanding walls 8 including a front wall, rear wall, and opposite side walls arranged to form a box-like member. Frame 6 includes a pair of upstanding spaced apart legs 9 and 10 which are bolted at their lower ends into the rear corners of base 7 so that base 7 and frame 6 in general form an L-shaped housing.

Base 7 incorporates roller means for permitting axial rotation of tire 2 with respect to frame 6 and base 7. This roller means includes a pair of rollers 11 and 12 rotatably mounted within base 7 in radially spaced relationship to one another. Rollers 11 and 12 extend between the front and rear walls of base 7 adjacent the side walls thereof. Rollers 11 and 12 are mounted near the upper edge margin of walls 8 so as to be spaced from the ground or other supporting surface for base 7. Rollers 11 and 12 engage tread 3 of tire 2 to support tire 2 off the ground to permit rotation thereof if desired.

A tire restraint is also provided on display stand 1 for holding tire 2 in its desired upright position. The tire restraint is in the form of a rectangular frame member which encircles the upper portion of tire 2 and is connected to the frame 6 in an outwardly projecting manner. The tire restraint includes a brace member 13 extending between legs 9 and 10 of frame 6 together with a U-shaped bracket member 14 projecting outwardly from frame 6 over tire 2. The tire restraint is assembled by inserting the free ends of bracket member 14 through openings or bores formed in the opposite ends of brace member 13 and then inserting the free ends of bracket member 14 through openings or bores formed in legs 9 and 10 until the free ends of bracket member 14 project from the rear side of legs 9 and 10. These free ends may then be secured to legs 9 and 10 by clips or nuts or in any other conventional manner. As best seen in FIG. 1, the height of brace member 13 and bracket member 14 is such that bracket member 14 encircles the top portion of tire 2. Therefore, in order to insert tire 2 so that it is supported in an upright manner by rollers 11, 12 and base 7, the lower end off tire 2 is first placed within base 7 and then bracket member 14 is manually grasped and flexed upwardly until it clears tread 3 of the upper end of tire 2. Tire 2 is then tipped inwardly toward frame 6, and then bracket member 14 is released so that it flexes downwardly and returns to its original position to hold tire 2 in an upright position. As shown best in FIG. 2, there is sufficient space between brace member 13 and bracket member 14 and the tread 3 and sidewalls 4 of tire 2 so as to permit tire 2 to be easily rotated on rollers 11 and 12 and yet be sufficiently supported in an upright manner for puncturing.

Display stand 1 also includes a handle assembly pivotally mounted on frame 6 above tire 2 for movement between a first non-puncturing position and a second tire puncturing position. The handle assembly is T-shaped with the head of the T comprising an axle 15 extending between legs 9 and 10 of frame 6 and rotatably mounted therebetween, and the leg of the T comprising a lever 16 projecting outwardly from axle 15 and frame 6 over and above tire 2. A grip 17 is located at the outer end of lever 16 for ease of grasping lever 16 in a non-slipping manner. As shown best in FIG. 1 axle 15 is located at a height which is above brace member 13 at a convenient user height so that adequate leverage may be obtained by a user. As a tire puncturing means, a spike member 18 is mounted on lever 16 intermediate its length at a location such that when lever 16 is moved to its tire puncturing position spike 18 punctures tread 3 of tire 2, as shown best in FIG. 2. Thus, the handle assembly functions as an actuating means for moving spike member 18 between a first non-puncturing position and a second tire puncturing position.

A flat, flexible, resilient plastic sheet member 19 is mounted on lever 16 of the handle assembly and projects beneath spike member 18 for engagement with the tread 3 of tire 2 in the puncturing position. The resilient member 19 functions as a spring means acting in opposition to the movement of the handle assembly from the first to the second positions to bias the handle assembly to its first non-puncturing position. The flexible member 19 includes an opening 20 formed intermediate its ends located beneath spike member 18 which thus permits spike member 18 to puncture tire 2 when moved to its puncturing position. Member 19 is preferably composed of polycarbonate. Polycarbonate is manufactured commercially in the United States by Mobay Chemical Corporation under the tradename "Merlon" and by General Electric Company under the trademark "Lexan". The resiliency of polycarbonate provides the spring force that bias spike member 18 to its non-puncturing position.

Refering now to FIG. 3 there is shown a locking mechanism for the handle assembly for locking spike member 18 in its nonpuncturing position. This locking mechanism includes a hitch pin 21 that extends through an opening in leg 10 and into a corresponding opening in a washer 22 located adjacent leg 10 on axle 15. Thus, when lever 16 is in an up position the opening in washer 22 is aligned with the opening in leg 10 so that pin 21 may be inserted therethrough. This holds lever 16 in an inoperative position. For additional security, a padlock 23 may be inserted through an opening in the end of pin 21 to prevent its removal from washer 22 and leg 10. Also, to prevent loss of pin 21 a chain 24 is mounted at one end to leg 10 and its other end to a ring 25 on pin 21. Thus, after pin 21 is withdrawn from washer 22 and leg 10 it may be allowed to hang by chain 24 from leg 10 without fear of being lost.

Finally, a header 26 may be slid onto the upper ends of legs 9 and 10. Header 26 may contain various indicia thereon, such as advertisements and operating instructions for display stand 1. As shown, header 26 comprises a panel 27 and a pair of legs 28 spaced apart a distance substantially equal to the spacing of legs 9 and 10. Legs 9 and 10 are channel-shaped, and since legs 28 are also channel-shaped with a dimension substantially equal to the channel opening in legs 9 and 10, legs 28 readily slide into legs 9 and 10. Thus, header 26 may be readily removed and inserted as desired.

Various modes of carrying out the invention are contemplated as being within the scope of the following claims particularly pointing out and distinctly claiming the subject matter which is regarded as the invention.

I claim:

1. A display stand for demonstrating puncture sealant tires, comprising:
    a housing for supporting a tire in an upright position, said housing including a frame and a base supporting said frame in an upright position;
    tire restraining means on said frame for holding the tire in its upright position, said tire restraining means includes a U-shaped bracket member mounted on said frame at a location spaced above said base and projecting from one side of said frame over said base and encircling a portion of the tire to hold the tire in an upright position;
    roller means on said base for permitting rotation of the tire with respect to said housing;
    a handle assembly pivotally mounted on said housing for movement between a first non-puncturing position and a second tire puncturing position;
    tire puncturing means carried by said handle assembly for movement between said first and second positions; and
    spring means carried by said handle assembly for acting in opposition to the movement of said handle assembly from said first position to said second position to bias said handle assembly to said first position, said spring means includes a resilient member mounted on said handle assembly and projecting beneath said tire puncture means for engagement with the tire prior to engagement of said tire puncture means with the tire in said tire puncturing position.

2. The display stand of claim 1, wherein said roller means includes a pair of rollers rotatably mounted on said base in radially spaced relationship to one another and positioned to engage and support the tire above a supporting surface for said base.

3. The display stand of claim 1, wherein said frame includes a pair of spaced apart upright legs.

4. The display stand of claim 3, wherein said handle assembly is T-shaped with the head of the T comprising an axle extending between the upright legs of said frame and rotatably mounted therebetween, and the leg of the T comprising a lever projecting outwardly from said frame over and above the tire.

5. The display stand of claim 4, wherein said puncturing means includes a spike member mounted on the lever of said handle assembly and projecting downwardly therefrom when said handle assembly is in its second tire-puncturing position.

6. The display stand of claim 5, further including lock means for locking said handle assembly in said first non-puncturing position.

7. The display stand of claim 5 wherein said spring means comprises a flat, flexible, resilient sheet member mounted on said lever at one of its ends outwardly of said spike member and at its other end inwardly of said spike member, said sheet member includes an opening formed intermediate its ends for permitting said spike member to pass therethrough and puncture the tire.

* * * * *